(12) United States Patent
Noh et al.

(10) Patent No.: US 11,887,330 B2
(45) Date of Patent: Jan. 30, 2024

(54) METHOD AND APPARATUS FOR ASSISTING OBJECT REGISTRATION IN A SMART HOME SYSTEM

(71) Applicant: KOREA ADVANCED INSTITUTE OF SCIENCE AND TECHNOLOGY, Daejeon (KR)

(72) Inventors: Junyong Noh, Daejeon (KR); Hyunggoog Seo, Daejeon (KR); Jaedong Kim, Daejeon (KR); Kwanggyoon Seo, Daejeon (KR); Bumki Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/848,813

(22) Filed: Jun. 24, 2022

(65) Prior Publication Data
US 2023/0162387 A1    May 25, 2023

(30) Foreign Application Priority Data
Nov. 25, 2021    (KR) .................. 10-2021-0163899

(51) Int. Cl.
*G06T 7/73* (2017.01)
*G06F 3/01* (2006.01)
(Continued)

(52) U.S. Cl.
CPC ............... *G06T 7/73* (2017.01); *G06F 3/012* (2013.01); *G06F 3/017* (2013.01); *G06F 3/03* (2013.01); *G06F 3/0484* (2013.01)

(58) Field of Classification Search
CPC . G06T 7/73; G06F 3/012; G06F 3/017; G06F 3/03; G06F 3/0484
See application file for complete search history.

(56) References Cited

U.S. PATENT DOCUMENTS 9,372,546 B2    6/2016    Yin et al.
2016/0170603 A1*  6/2016    Bastien ................ H04N 13/254
                                                    348/49
(Continued)

FOREIGN PATENT DOCUMENTS

CN              107004279 B      9/2020
KR          10-2010-0037254 A    4/2010
(Continued)

OTHER PUBLICATIONS

Seo, Hyunggoog et al.; "A Simple and Intuitive Object Registration Method for an Absolute Mid-air Pointing Interface"; Proc. ACM Interact. Mob. Wearable Ubiquitous Technol.; Sep. 2021; Total 24 Pages; vol. 5; No. 3, Article 127.

*Primary Examiner* — Amare Mengistu
*Assistant Examiner* — Sarvesh J Nadkarni
(74) *Attorney, Agent, or Firm* — Studebaker & Brackett PC

(57) ABSTRACT

A method of assisting object registration in a smart home system including a plurality of objects is disclosed. The disclosed method may include allowing a user to select an object from among a plurality of objects, capturing a plurality of pointing gestures by allowing the user to perform the plurality of pointing gestures at the selected object, configuring a pointing ray using each of the plurality of captured pointing gestures, estimating a position of a nearest point extending from the plurality of pointing rays, and registering the estimated position of the nearest point as a position of the selected object.

11 Claims, 3 Drawing Sheets

(51) Int. Cl.
    *G06F 3/03*         (2006.01)
    *G06F 3/0484*     (2022.01)

(56)         References Cited

U.S. PATENT DOCUMENTS

| | | | |
|---|---|---|---|
| 2018/0032125 A1* | 2/2018 | Peterson | G06F 3/012 |
| 2018/0059901 A1* | 3/2018 | Gullicksen | G06F 3/017 |
| 2019/0129607 A1* | 5/2019 | Saurabh | G06F 3/011 |

FOREIGN PATENT DOCUMENTS

| | | |
|---|---|---|
| KR | 10-2015-0028181 A | 3/2015 |
| KR | 10-2016-0048062 A | 5/2016 |

* cited by examiner

METHOD AND APPARATUS FOR ASSISTING OBJECT REGISTRATION IN A SMART HOME SYSTEM

CROSS-REFERENCE TO RELATED APPLICATION

This application claims the benefit of Korean Patent Application No. 10-2021-0163899 filed on Nov. 25, 2021, at the Korean Intellectual Property Office, the entire disclosure of which is incorporated herein by reference for all purposes.

BACKGROUND

1. Field of the Invention

One or more example embodiments relate to technology for registering an object in a smart home environment.

2. Description of the Related Art

A mid-air pointing technique has become an important technology in relation to a smart home system that has recently emerged. In a smart home system, it may be possible to select objects which are smart devices configuring the system and to control operations of the objects by using the mid-air pointing technique instead of using a remote control. In the process of using the mid-air pointing technique, a procedure called "registration" that allows the system to understand three-dimensional positions and object types is essential. Such object registration requires a cumbersome process performed by experts in a precisely calibrated environment. Thus, existing studies on the mid-air pointing technique assume that registration has already been completed and focus only on a technique related to subsequent procedures. Accordingly, the existing studies on object registration have not produced any meaningful findings.

SUMMARY

A technical goal obtainable from the present disclosure is to provide a technology for assisting object registration in a smart home system.

The technical goal obtainable from the present disclosure is not limited to the above-mentioned technical goal, and other unmentioned technical goals may be clearly understood from the following description by those having ordinary skill in the technical field to which the present disclosure pertains.

According to an aspect, there is provided a method of assisting object registration in a smart home system including a plurality of objects. The method may include allowing a user to select an object from among a plurality of objects, capturing a plurality of pointing gestures by allowing a user to perform the plurality of pointing gestures at the selected object, configuring a pointing ray using each of the plurality of captured pointing gestures, estimating a position of a nearest point extending from the plurality of pointing rays, and registering the estimated position of the nearest point as a position of the selected object.

In an example embodiment, each of the plurality of objects is a smart home device.

In an example embodiment, the allowing of the user to select the object from among the plurality of objects includes displaying, on a terminal carried by the user, a screen prompting the user to select one of the plurality of objects.

In an example embodiment, capturing of the plurality of pointing gestures by allowing the user to perform the plurality of pointing gestures at the selected object includes displaying, on a terminal carried by the user, a screen prompting the user to perform a plurality of pointing gestures.

In an example embodiment, the plurality of pointing gestures includes a gesture of grabbing the selected object with a hand or touching the selected object from a distance.

In an example embodiment, the capturing of the plurality of pointing gestures by allowing the user to perform the plurality of pointing gestures at the selected object includes providing a plurality of images by capturing each of the plurality of pointing gestures a plurality of times.

In an example embodiment, the configuring of the pointing ray using each of the plurality of captured pointing gestures includes identifying a head position of the user a plurality of times using the plurality of images, calculating a mean head position of the user by averaging the identified head positions of the user, identifying a hand position of the user a plurality of times using the plurality of images, calculating a mean hand position of the user by averaging the identified hand positions of the user, defining a gesture-direction vector using the mean head position of the user and the mean hand position of the user, and configuring the pointing ray using the mean head position of the user and the gesture-direction vector.

In an example embodiment, the configuring of the pointing ray using the mean head position of the user and the gesture-direction vector includes configuring the pointing ray using the following equation:

$$r_n = P_n + a_n \cdot u_n$$

where n denotes an index indicating a pointing ray number, $r_n$ denotes an n-th pointing ray, $P_n$ denotes a mean head position of the user used to configure the n-th pointing ray, $a_n$ denotes a scalar value used to configure the n-th pointing ray, and $u_n$ denotes a gesture-direction vector used to configure the n-th pointing ray.

In an example embodiment, the configuring of the pointing ray using each of the plurality of captured pointing gestures includes identifying a head position of the user from the corresponding captured gesture, identifying a hand position of the user from the corresponding captured gesture, defining a gesture-direction vector using the identified head position of the user and the identified hand position of the user, and configuring the pointing ray using the head position of the user and the gesture-direction vector.

In an example embodiment, the configuring of the pointing ray using the head position of the user and the gesture-direction vector includes configuring the pointing ray using the following equation:

$$r_n = P_n + a_n \cdot u_n$$

where n denotes an index indicating a pointing ray number, $r_n$ denotes an n-th pointing ray, $P_n$ denotes a head position of the user used to configure the n-th pointing ray, $a_n$ denotes a scalar parameter used to configure the n-th pointing ray, and $u_n$ denotes a gesture-direction vector used to configure the n-th pointing ray.

In an example embodiment, the estimating of the position of the nearest point extending from the plurality of pointing rays includes obtaining a solution of a vector x defined by the following equations using a Least Square Method (LSM):

$$x = (A^T A)^{-1} A^T b$$

$$A = \begin{bmatrix} 1 & 0 & 0 & -u_{x1} & 0 & 0 & & 0 \\ 0 & 1 & 0 & -u_{y1} & 0 & 0 & & 0 \\ 0 & 0 & 1 & -u_{z1} & 0 & 0 & & 0 \\ 1 & 0 & 0 & 0 & -u_{x2} & 0 & & 0 \\ 0 & 1 & 0 & 0 & -u_{y2} & 0 & \cdots & 0 \\ 0 & 0 & 1 & 0 & -u_{z2} & 0 & & 0 \\ 1 & 0 & 0 & 0 & 0 & -u_{x3} & & 0 \\ 0 & 1 & 0 & 0 & 0 & -u_{y3} & & 0 \\ 0 & 0 & 1 & 0 & 0 & -u_{z3} & & 0 \\ & & & \vdots & & & \ddots & \vdots \\ 1 & 0 & 0 & 0 & 0 & 0 & & -u_{xn} \\ 0 & 1 & 0 & 0 & 0 & 0 & \cdots & -u_{yn} \\ 0 & 0 & 1 & 0 & 0 & 0 & & -u_{zn} \end{bmatrix}$$

$$x = \begin{bmatrix} x \\ y \\ z \\ a_1 \\ a_2 \\ a_3 \\ \vdots \\ a_n \end{bmatrix}$$

$$b = \begin{bmatrix} x_1 \\ y_1 \\ z_1 \\ x_2 \\ y_2 \\ z_2 \\ x_3 \\ y_3 \\ z_3 \\ \vdots \\ x_n \\ y_n \\ z_n \end{bmatrix}$$

where $u_{xn}$, $u_{yn}$, and $u_{zn}$ denote x, y, and z components in an orthogonal coordinate system of a gesture-direction vector $u_n$ used to configure an n-th pointing ray, x, y, and z are variables indicating x, y, and z components in an orthogonal coordinate system of the nearest point, and $x_n$, $y_n$, and $z_n$ denote x, y, and z components in an orthogonal coordinate system of a head position $P_n$ of a user used to configure the n-th pointing ray.

In an example embodiment, the method further includes defining a function approximating a relationship between angles formed by pointing rays and mean estimation errors corresponding to the angles, identifying a maximum angle among the angles formed by the plurality of pointing rays, calculating a mean estimation error corresponding to the maximum angle using the function, and determining the estimated position of the nearest point as an erroneously estimated position in response to the calculated mean estimation error being greater than or equal to a predetermined value.

According to another aspect, there is provided a device for assisting object registration in a smart home system including a plurality of objects. The device may include a controller, and a communicator coupled to the controller and configured to communicate with a terminal carried by a user. The controller may be configured to control to display, on the terminal, through the communicator, a screen prompting the user to select an object from among a plurality of objects, to control to display, on the terminal, in response to the user selecting an object, through the communicator, a screen prompting the user to perform a plurality of pointing gestures at the selected object, and to capture, in response to the user performing the plurality of pointing gestures within a field of view (FOV) of a camera coupled to the device, the plurality of pointing gestures through the camera. The controller may be further configured to configure a pointing ray using each of the plurality of captured pointing gestures, to estimate a position of a nearest point extending from the plurality of pointing rays, and to register the estimated position of the nearest point as a position of the selected object.

In an example embodiment, each of the plurality of objects is a smart home device.

In an example embodiment, the plurality of pointing gestures includes a gesture of grabbing the selected object with a hand or touching the selected object from a distance.

In an example embodiment, the controller is further configured to provide a plurality of images by capturing each of the plurality of pointing gestures a plurality of times.

In an example embodiment, the controller is further configured to identify a head position of the user a plurality of times using the plurality of images, to calculate a mean head position of the user by averaging the identified head positions of the user, to identify a hand position of the user a plurality of times using the plurality of images, to calculate a mean hand position of the user by averaging the identified hand positions of the user, to define a gesture-direction vector using the mean head position of the user and the mean hand position of the user, and to configure the pointing ray using the mean head position of the user and the gesture-direction vector.

In an example embodiment, the controller is further configured to configure the pointing ray using the following equation:

$$r_n = P_n + a_n \cdot u_n$$

where n denotes an index indicating a pointing ray number, $r_n$ denotes an n-th pointing ray, $P_n$ denotes a mean head position of the user used to configure the n-th pointing ray, $a_n$ denotes a scalar value used to configure the n-th pointing ray, and $u_n$ denotes a gesture-direction vector used to configure the n-th pointing ray.

In an example embodiment, the controller is further configured to obtain a solution of a vector x defined by the following equations using an LSM:

$$x = (A^T A)^{-1} A^T b$$

$$A = \begin{bmatrix} 1 & 0 & 0 & -u_{x1} & 0 & 0 & & 0 \\ 0 & 1 & 0 & -u_{y1} & 0 & 0 & & 0 \\ 0 & 0 & 1 & -u_{z1} & 0 & 0 & & 0 \\ 1 & 0 & 0 & 0 & -u_{x2} & 0 & & 0 \\ 0 & 1 & 0 & 0 & -u_{y2} & 0 & \cdots & 0 \\ 0 & 0 & 1 & 0 & -u_{z2} & 0 & & 0 \\ 1 & 0 & 0 & 0 & 0 & -u_{x3} & & 0 \\ 0 & 1 & 0 & 0 & 0 & -u_{y3} & & 0 \\ 0 & 0 & 1 & 0 & 0 & -u_{z3} & & 0 \\ & & & \vdots & & & \ddots & \vdots \\ 1 & 0 & 0 & 0 & 0 & 0 & & -u_{xn} \\ 0 & 1 & 0 & 0 & 0 & 0 & \cdots & -u_{yn} \\ 0 & 0 & 1 & 0 & 0 & 0 & & -u_{zn} \end{bmatrix}$$

$$x = \begin{bmatrix} x \\ y \\ z \\ a_1 \\ a_2 \\ a_3 \\ \vdots \\ a_n \end{bmatrix}$$

-continued $$b = \begin{bmatrix} x_1 \\ y_1 \\ z_1 \\ x_2 \\ y_2 \\ z_2 \\ x_3 \\ y_3 \\ z_3 \\ \vdots \\ x_n \\ y_n \\ z_n \end{bmatrix}$$

where $u_{xn}$, $u_{yn}$, and $u_{zn}$ denote x, y, and z components in an orthogonal coordinate system of a gesture-direction vector $u_n$ used to configure an n-th pointing ray, x, y, and z are variables indicating x, y, and z components in an orthogonal coordinate system of the nearest point, and $x_n$, $y_n$, and $z_n$ denote x, y, and z components in an orthogonal coordinate system of a head position $P_n$ of a user used to configure the n-th pointing ray.

Additional aspects of example embodiments will be set forth in part in the description which follows and, in part, will be apparent from the description, or may be learned by practice of the disclosure.

According to example embodiments, there is a technical effect that the performing of object registration in a smart home system is efficient and smooth.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
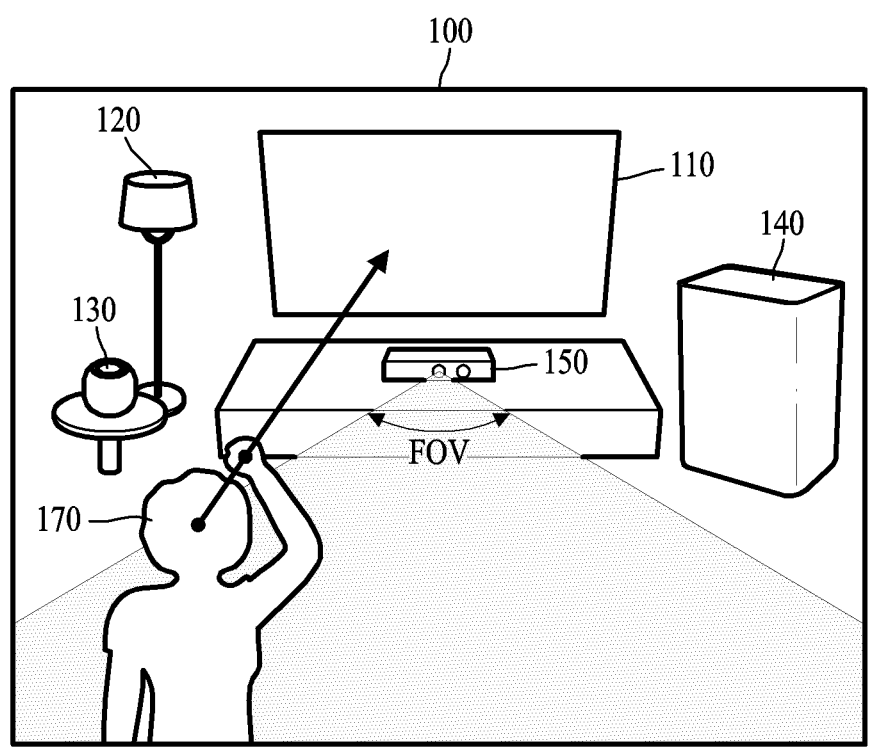
FIG. 1 is a diagram illustrating an example embodiment of a smart home system according to the present disclosure.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as "first", "second", and the like, may be used herein to describe components. Each of these terminologies is not used to define an essence, order or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical or scientific terms have the same meaning as commonly understood by one of ordinary skill in the art to which examples belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like elements and any repeated description related thereto will be omitted.

FIG. 1 is a diagram illustrating an example embodiment of a smart home system according to the present disclosure.

As illustrated in FIG. 1, a smart home system 100 may include various smart home devices installed in spaces such as general households, offices, and public places. A smart home device may include a TV 110, a lamp 120, a smart speaker 130, such as an artificial intelligence (AI) speaker, and an air purifier 140, but types of smart home device included in the smart home system 100 are not limited thereto. Hereinafter, for ease of description, a smart home device may be simply referred to as an "object".

The smart home system 100 may further include a computing device (not shown) and a camera 150 coupled to the computing device. In an example embodiment, the camera 150 may be a red, green, blue-depth (RGBD) camera. In an example embodiment, the camera 150 may be connected to a universal serial bus (USB) of the computing device. The camera 150 may be operated to transmit RGB images captured under the control of the computing device and depth information to the computing device. The computing device may communicate with a terminal (not shown) carried by a user 170, and may allow the user 170 to select an object to be registered through the terminal carried by the user 170. The terminal may include an application configured to interact with the computing device, such as to display various screens that help the user 170 to perform object registration by communicating with the computing device and to transmit inputs the user 170 inputs to the terminal to the computing device. The terminal may be designed to implement a Transmission Control Protocol/Internet Protocol (TCP/IP) protocol to support IP communication with the computing device, and may be designed to implement a wireless fidelity (Wi-Fi) protocol for wireless access to an IP network. The terminal may also be designed to implement one or more Radio Access Technology (RAT), such as 5th Generation (5G) New Radio (NR), and long-term evolution (LTE)/LTE-advanced to support wireless communication. In an example embodiment, the terminal may include a mobile terminal, such as a tablet personal computer (PC), a notebook, a notepad, and various types of handheld-based wireless communication device, such as a smartphone, but types of terminal are not limited thereto.

Figure 2:
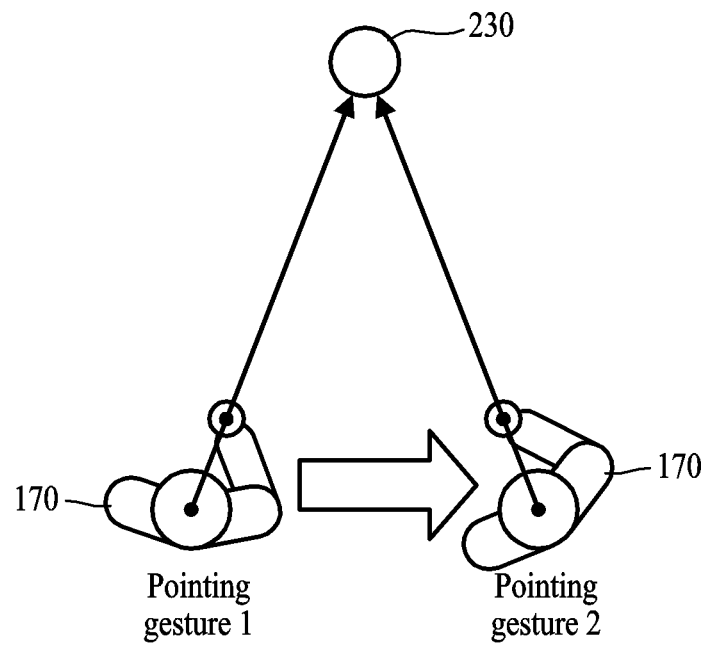
FIG. 2 is a diagram illustrating an example that a user performs a pointing gesture at an object.

In response to an object to be registered being selected by the user 170, the computing device may allow the user 170 to perform a plurality of pointing gestures at the corresponding object through the terminal carried by the user 170. As illustrated in FIG. 2, the user 170 may perform a pointing gesture two or more times with respect to an object 230 to be registered while moving from side to side in a space within a field of view (FOV) of the camera 150. The pointing gesture performed by the user 170 may be a gesture of grabbing the object 230 with a hand or touching the object 230 from a distance to reduce an estimation error. The computing device may provide a plurality of images by capturing and imaging the pointing gestures performed by the user 170 within the FOV of the camera 150. In an example embodiment, the computing device may provide 30 image frames per pointing gesture by capturing each of the pointing gestures performed by the user 170 for one second. The computing device may estimate a position in the space indicated by the user 170 with the pointing gestures by analyzing the provided image frames, and may register the estimated position as a position of an object to be registered. In response to completion of objection registration, the user 170 may control the corresponding object in a way that the user 170 may desire, for example, by giving a command to the object by pointing to the corresponding object.

Figure 3:
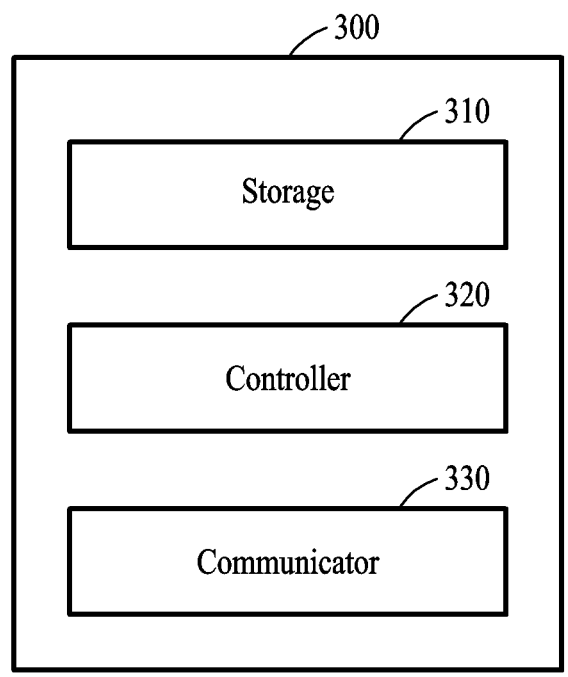
FIG. 3 is a diagram illustrating an example embodiment of a block diagram of a computing device illustrated with reference to FIG. 1.

FIG. 3 is a diagram illustrating an example embodiment of a block diagram of a computing device illustrated with reference to FIG. 1.

As illustrated in FIG. 3, a computing device 300 may include a storage 310, a controller 320, and a communicator 330. The components illustrated in FIG. 3 may not reflect all functions of the computing device 300 and are not essential, and thus, it should be understood that the computing device 300 may include more or fewer components than the illustrated components.

The storage 310 may be coupled to the controller 320, store a program and/or data to operate the controller 320, and also store input/output data. The storage 310 may include at least one type of storage media of a flash memory type, a hard disk type, a multimedia card micro type, a card type memory (e.g., an SD or XE memory), a Random Access Memory (RAM), a Static RAM, a Read-Only Memory (ROM), an Electrically Erasable Programmable ROM, a Programmable ROM, a magnetic memory, a magnetic disk, and an optical disk. The communicator 330 may be coupled to the controller 320, and may include hardware and/or firmware to implement a TCP/IP protocol for supporting IP communication with the terminal carried by the user 170 and a Wi-Fi protocol for supporting wireless access to an IP network.

The controller 320 may be configured to control to display, on the terminal carried by the user 170, through the communicator 330, a screen prompting the user 170 to select an object from among a plurality of objects, to control, in response to the user 170 selecting an object, through the communicator 330, a screen prompting the user 170 to perform a plurality of pointing gestures at the selected object, and to capture, in response to the user 170 performing the plurality of pointing gestures within the FOV of the camera 150 coupled to the computing device 300, the plurality of pointing gestures through the camera 150. The controller 320 may be further configured to configure a pointing ray using each of the plurality of captured pointing gestures, to estimate a position of a nearest point extending from the plurality of pointing rays, and to register the estimated position of the nearest point as a position of the selected object.

In an example embodiment, the controller 320 may be further configured to provide a plurality of images and depth information by capturing each of the plurality of pointing gestures a plurality of times. The controller 320 may implement an operation of capturing each of the plurality of pointing gestures a plurality of times by performing an operation of receiving the plurality of images and depth information from the camera 150. In such example embodiment, the controller 320 may be further configured to identify a head position of the user 170 a plurality of times using the plurality of images and depth information, to calculate a mean head position of the user 170 by averaging the identified head positions of the user 170, to identify a hand position of the user 170 using the plurality of images, and to calculate a mean hand position of the user 170 by averaging the identified hand positions of the user 170. In such example embodiment, the controller 320 may be configured to identify a head position and hand position of the user 170 using at least one of known various image processing techniques in each of the plurality of images. In such example embodiment, the controller 320 may be further configured to define a gesture-direction vector using the mean head position of the user 170 and the mean hand position of the user 170, and to configure the pointing ray using the mean head position of the user 170 and the gesture-direction vector. In such example embodiment, the controller 320 may be configured to configure the pointing ray using Equations 1 to 3 below.

$$r_n = P_n + a_n \cdot u_n \quad \text{[Equation 1]}$$

In Equation 1, n denotes an index indicating a pointing ray number, $r_n$ denotes an n-th pointing ray, $P_n$ denotes a mean head position of the user 170 used to configure the n-th pointing ray, $a_n$ denotes a scalar value used to configure the n-th pointing ray, and $u_n$ denotes a gesture-direction vector used to configure the n-th pointing ray.

$$P_n = \begin{bmatrix} x_n \\ y_n \\ z_n \end{bmatrix} \quad \text{[Equation 2]}$$

In Equation 2, n denotes an index indicating a pointing ray number, $x_n$, $y_n$, and $z_n$ denote x, y, and z components in an orthogonal coordinate system of $P_n$.

$$u_n = \begin{bmatrix} u_{xn} \\ u_{yn} \\ u_{zn} \end{bmatrix} \quad \text{[Equation 3]}$$

In Equation 3, n denotes an index indicating a pointing ray number, $u_{xn}$, $u_{yn}$, and $u_{zn}$ denote x, y, and z components in an orthogonal coordinate system of $u_n$.

In an example embodiment, the controller 320 may be configured to identify the head position of the user 170 and the hand position of the user 170 using the captured gesture, such as at least one image and depth information received from the camera 150. In such example embodiment, the controller 320 may be configured to identify the head position and hand position of the user 170 using at least one of known various image processing techniques in the at least one image. In such example embodiment, the controller 320 may be further configured to define the gesture-direction vector using the head position of the user 170 and the hand position of the user 170, and to configure the pointing ray using the head position of the user 170 and the gesture-direction vector. In such example embodiment, the controller may be further configured to configure the pointing ray using Equation 4 below, and Equations 1 and 2 above.

$$r_n = P_n + a_n \cdot u_n \quad \text{[Equation 4]}$$

In Equation 4, n denotes an index indicating a pointing ray number, $r_n$ denotes an n-th pointing ray, $P_n$ denotes the head position of the user 170 used to configure the n-th pointing ray, $a_n$ denotes a scalar parameter used to configure the n-th pointing ray, and $u_n$ denotes a gesture-direction vector used to configure the n-th pointing ray.

The controller 320 may be further configured to obtain a solution of a vector x defined by the following Equations 5 to 8 using a Least Square Method (LSM).

$$x = (A^T A)^{-1} A^T b \quad \text{[Equation 5]}$$

$$A = \begin{bmatrix} 1 & 0 & 0 & -u_{x1} & 0 & 0 & & 0 \\ 0 & 1 & 0 & -u_{y1} & 0 & 0 & & 0 \\ 0 & 0 & 1 & -u_{z1} & 0 & 0 & & 0 \\ 1 & 0 & 0 & 0 & -u_{x2} & 0 & & 0 \\ 0 & 1 & 0 & 0 & -u_{y2} & 0 & \cdots & 0 \\ 0 & 0 & 1 & 0 & -u_{z2} & 0 & & 0 \\ 1 & 0 & 0 & 0 & 0 & -u_{x3} & & 0 \\ 0 & 1 & 0 & 0 & 0 & -u_{y3} & & 0 \\ 0 & 0 & 1 & 0 & 0 & -u_{z3} & & 0 \\ & & & \vdots & & & \ddots & \vdots \\ 1 & 0 & 0 & 0 & 0 & 0 & & -u_{xn} \\ 0 & 1 & 0 & 0 & 0 & 0 & \cdots & -u_{yn} \\ 0 & 0 & 1 & 0 & 0 & 0 & & -u_{zn} \end{bmatrix} \quad \text{[Equation 6]}$$

In Equation 6, $u_{xn}$, $u_{yn}$, and $u_{zn}$ in denote x, y, and z components in an orthogonal coordinate system of a gesture-direction vector $u_n$ used to configure an n-th pointing ray.

$$x = \begin{bmatrix} x \\ y \\ z \\ a_1 \\ a_2 \\ a_3 \\ \vdots \\ a_n \end{bmatrix} \quad \text{[Equation 7]}$$

In Equation 7, x, y, and z are variables indicating x, y, and z components in an orthogonal coordinate system of a nearest point extending from the plurality of pointing rays.

$$b = \begin{bmatrix} x_1 \\ y_1 \\ z_1 \\ x_2 \\ y_2 \\ z_2 \\ x_3 \\ y_3 \\ z_3 \\ \vdots \\ x_n \\ y_n \\ z_n \end{bmatrix} \quad \text{[Equation 8]}$$

In Equation 8, $x_n$, $y_n$, and $z_n$ denote x, y, and z components in an orthogonal coordinate system of a head position $P_n$ of the user 170 used to configure the n-th pointing ray.

The controller 320 may be further configured to define a function approximating a relationship between angles formed by the pointing rays and mean estimation errors corresponding to the angles. In an example embodiment, the controller 320 may be configured to store each of the angles formed by the pointing rays and each of the mean estimation errors corresponding to the angles, which are associated with each other, in a form of a look-up table in the storage 310, and to extract a mean estimation error with reference to the look-up table. If the user 170 performs the pointing gestures while moving to a position that is too close, an angle between the pointing rays may be reduced accordingly, and thus a probability of an estimation error occurring may increase. In order to identify the relationship between the angles formed by the pointing rays and the mean estimation errors corresponding to the angles, a position of an object to be registered may be identified in advance by placing a separate camera different from the camera 150 behind the object, positions indicated by the user 170 may be estimated by capturing a plurality of gestures performed by the user 170 while moving around within the FOV of the camera 150, and accordingly, data on an estimation error may be collected by comparing the estimated positions and the previously identified position of the corresponding object. Performing curve fitting on the collected data may help to obtain a function approximating the collected data. An example embodiment of the approximation function is represented by Equation 9 below.

$$y = e^{-0.249} \cdot x^{-0.37} \quad \text{[Equation 9]}$$

The controller 320 may be further configured to identify a maximum angle among the angles formed by the plurality of pointing rays, to calculate a mean estimation error corresponding to the maximum angle using the approximation function, and to determine the estimated position of the nearest point as an erroneously estimated position in response to the calculated mean estimation error being greater than or equal to a predetermined value.

Figure 4:
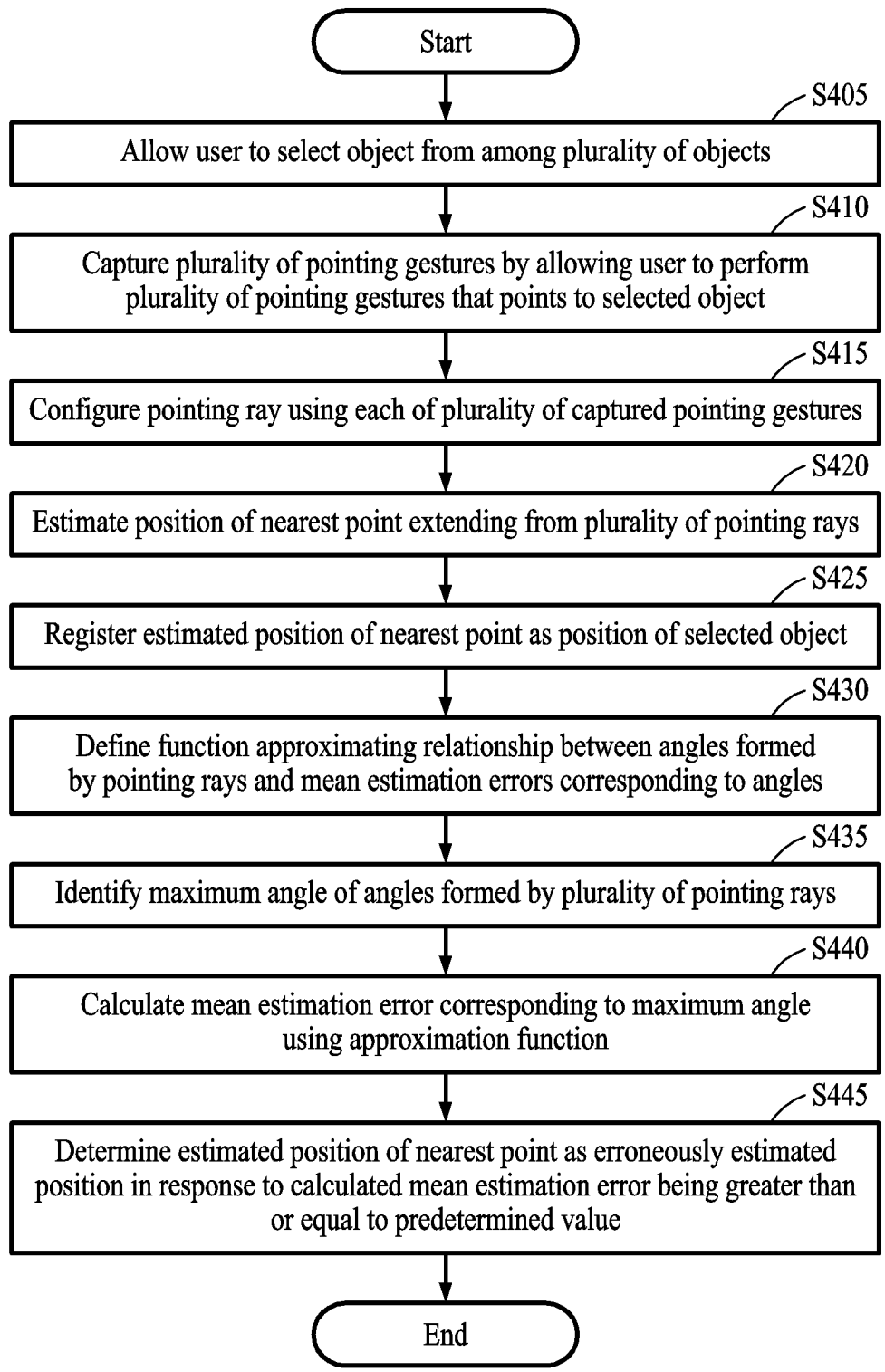
FIG. 4 is a diagram illustrating a flowchart for explaining an example embodiment of a method executed by a computing device to assist object registration in a smart home system.

FIG. 4 is a diagram illustrating a flowchart of an example embodiment of a method executed by a computing device to assist object registration in a smart home system.

As illustrated in FIG. 4, the method starts with step S405 of allowing the user 170 to select an object from among a plurality of objects. In this step, it may be possible to control to display, on the terminal carried by the user 170, a screen prompting the user 170 to select the object of the plurality of objects. In step S410, a plurality of pointing gestures may be captured by allowing the user to perform a plurality of pointing gestures at the selected object 230. In this step, it may be possible to control to display, on the terminal carried by the user 170, a screen prompting the user 170 to perform the plurality of pointing gestures. In an example embodiment, a plurality of images may be provided by capturing each of the plurality of pointing gestures a plurality of times. In an example embodiment, an image may be provided by capturing each of the plurality of pointing gestures once.

In step S415, a pointing ray may be configured using each of the plurality of captured pointing gestures. In an example embodiment in which the plurality of images is provided for each of the plurality of pointing gestures, the pointing ray may be configured by identifying a head position of the user 170 a plurality of times using the plurality of images, by calculating a mean head position of the user 170 by averaging the identified head positions of the user 170, by identifying a hand position of the user 170 a plurality of times using the plurality of images, by calculating a mean hand position of the user 170 by averaging the identified hand positions of the user 170, by defining a gesture-direction vector using the mean head position of the user 170 and the mean hand position of the user 170, and by using the mean head position of the user 170 and the gesture-direction vector. In such an example embodiment, the pointing ray may be configured using Equation 1 above. Meanwhile, in an example embodiment in which an image is provided for each of the plurality of pointing gestures, the pointing ray may be configured by identifying a head position of the user 170 from the corresponding captured gesture, by identifying a hand position of the user 170 from the corresponding captured gesture, by defining a gesture-direction vector using the identified head position of the user 170 and the identified hand position of the user 170, and by using the head position of the user 170 and the gesture-direction vector. In such an example embodiment, the pointing ray may be configured using Equation 4 above.

In step S420, a position of a nearest point extending from the plurality of the pointing rays may be estimated. In this step, as described above, the position of the nearest point extending from the plurality of pointing rays may be estimated by obtaining a solution of a vector x defined by Equations 5 to 8 above using an LSM. In step S425, the estimated position of the nearest point may be registered as a position of the selected object 230. In response to step S425 being performed, steps S430 to S445 described below may be selectively performed.

In step S430, a function approximating a relationship between angles formed by the pointing rays and mean estimation errors corresponding to the angles may be defined. In step S435, a maximum angle of the angles formed by the plurality of pointing rays may be identified. In step S440, a mean estimation error corresponding to the maximum angle may be calculated using the approximation function. In step S445, in response to the calculated mean estimation error being greater than or equal to a predetermined value, the estimated position of the nearest point may be determined as an erroneously estimated position.

The example embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of assisting object registration in a smart home system comprising a plurality of home devices, performed by a computing device, the method comprising:
controlling, by the computing device, a user terminal to display a first screen that requests a user to select one home device from the plurality of home devices;
receiving, by the computing device, from the user terminal, a selection of the home device;
controlling, by the computing device, the user terminal to display a second screen that requests the user to perform a plurality of pointing gestures toward the selected home device;
capturing, by a camera, in response to performing the plurality of pointing gestures by the user within a field of view (FOV) of the camera, the plurality of pointing gestures;
configuring a pointing ray using each of the plurality of captured pointing gestures;
estimating a position of a nearest point extending from the plurality of pointing rays; and
registering the estimated position of the nearest point as a position of the selected home device,
wherein the configuring of the pointing ray using each of the plurality of captured pointing gestures comprises:
identifying a head position of the user from a corresponding captured gesture;
identifying a hand position of the user from a corresponding captured gesture;
defining a gesture-direction vector using the identified head position of the user and the identified hand position of the user; and
configuring the pointing ray using the head position of the user and the gesture-direction vector, and
wherein the configuring of the pointing ray using the head position of the user and the gesture-direction vector comprises configuring the pointing ray using the following equation:

$$r_n = P_n + a_n \cdot u_n$$

where n denotes an index indicating a pointing ray number, $r_n$ denotes an n-th pointing ray, $P_n$ denotes a head position of the user used to configure the n-th pointing ray, $a_n$ denotes a scalar parameter used to configure the n-th pointing ray, and $u_n$ denotes a gesture-direction vector used to configure the n-th pointing ray.

2. The method of claim 1, wherein the plurality of pointing gestures comprises a gesture of grabbing the selected home device with a hand or touching the selected home device from a distance.

3. The method of claim 1, wherein the capturing of the plurality of pointing gestures comprises providing a plurality of images by capturing each of the plurality of pointing gestures a plurality of times.

4. The method of claim 3, wherein the configuring of the pointing ray using each of the plurality of captured pointing gestures comprises:
identifying a head position of the user a plurality of times using the plurality of images;
calculating a mean head position of the user by averaging the identified head positions of the user;
identifying a hand position of the user a plurality of times using the plurality of images;
calculating a mean hand position of the user by averaging the identified hand positions of the user;
defining a gesture-direction vector using the mean head position of the user and the mean hand position of the user; and
configuring the pointing ray using the mean head position of the user and the gesture-direction vector.

5. The method of claim 1, wherein the estimating of the position of the nearest point extending from the plurality of pointing rays comprises obtaining a solution of a vector x defined by the following equations using a Least Square Method (LSM):

$$x = (A^T A)^{-1} A^T b$$

$$A = \begin{bmatrix} 1 & 0 & 0 & -u_{x1} & 0 & 0 & & 0 \\ 0 & 1 & 0 & -u_{y1} & 0 & 0 & & 0 \\ 0 & 0 & 1 & -u_{z1} & 0 & 0 & & 0 \\ 1 & 0 & 0 & 0 & -u_{x2} & 0 & & 0 \\ 0 & 1 & 0 & 0 & -u_{y2} & 0 & \cdots & 0 \\ 0 & 0 & 1 & 0 & -u_{z2} & 0 & & 0 \\ 1 & 0 & 0 & 0 & 0 & -u_{x3} & & 0 \\ 0 & 1 & 0 & 0 & 0 & -u_{y3} & & 0 \\ 0 & 0 & 1 & 0 & 0 & -u_{z3} & & 0 \\ & & & \vdots & & & \ddots & \vdots \\ 1 & 0 & 0 & 0 & 0 & 0 & & -u_{xn} \\ 0 & 1 & 0 & 0 & 0 & 0 & \cdots & -u_{yn} \\ 0 & 0 & 1 & 0 & 0 & 0 & & -u_{zn} \end{bmatrix}$$

$$x = \begin{bmatrix} x \\ y \\ z \\ a_1 \\ a_2 \\ a_3 \\ \vdots \\ a_n \end{bmatrix}$$

$$b = \begin{bmatrix} x_1 \\ y_1 \\ z_1 \\ x_2 \\ y_2 \\ z_2 \\ x_3 \\ y_3 \\ z_3 \\ \vdots \\ x_n \\ y_n \\ z_n \end{bmatrix}$$

where $u_{xn}$, $u_{yn}$, and $u_{zn}$ denote x, y, and z components in an orthogonal coordinate system of a gesture-direction vector $u_n$ used to configure an n-th pointing ray, x, y, and z are variables indicating x, y, and z components in an orthogonal coordinate system of the nearest point, and $x_n$, $y_n$, and $z_n$ denote x, y, and z components in an orthogonal coordinate system of a head position $P_n$ of a user used to configure the n-th pointing ray.

6. The method of claim 1, further comprising:
defining a function approximating a relationship between angles formed by pointing rays and mean estimation errors corresponding to the angles;
identifying a maximum angle among the angles formed by the plurality of pointing rays;
calculating a mean estimation error corresponding to the maximum angle using the function; and
determining the estimated position of the nearest point as an erroneously estimated position in response to the calculated mean estimation error being greater than or equal to a predetermined value.

7. A non-transitory computer-readable storage medium storing instructions that, when executed by a processor, cause the processor to perform the method of claim 1.

8. A method of assisting object registration in a smart home system comprising a plurality of home devices, performed by a computing device, the method comprising:
controlling, by the computing device, a user terminal to display a first screen that requests a user to select one home device from the plurality of home devices;
receiving, by the computing device, from the user terminal, a selection of the home device;
controlling, by the computing device, the user terminal to display a second screen that requests the user to perform a plurality of pointing gestures toward the selected home device;
capturing, by a camera, in response to performing the plurality of pointing gestures by the user within a field of view (FOV) of the camera, the plurality of pointing gestures;
configuring a pointing ray using each of the plurality of captured pointing gestures;
estimating a position of a nearest point extending from the plurality of pointing rays; and
registering the estimated position of the nearest point as a position of the selected home device,
wherein the capturing of the plurality of pointing gestures comprises providing a plurality of images by capturing each of the plurality of pointing gestures a plurality of times,
wherein the configuring of the pointing ray using each of the plurality of captured pointing gestures comprises:
identifying a head position of the user a plurality of times using the plurality of images;
calculating a mean head position of the user by averaging the identified head positions of the user;
identifying a hand position of the user a plurality of times using the plurality of images;
calculating a mean hand position of the user by averaging the identified hand positions of the user;
defining a gesture-direction vector using the mean head position of the user and the mean hand position of the user; and
configuring the pointing ray using the mean head position of the user and the gesture-direction vector, and
wherein the configuring of the pointing ray using the mean head position of the user and the gesture-direction vector comprises configuring the pointing ray using the following equation:

$$r_n = P_n + a_n \cdot u_n$$

where n denotes an index indicating a pointing ray number, $r_n$ denotes an n-th pointing ray, $P_n$ denotes a mean head position of the user used to configure the n-th pointing ray, $a_n$ denotes a scalar value used to configure the n-th pointing ray, and $u_n$ denotes a gesture-direction vector used to configure the n-th pointing ray.

9. A device for assisting object registration in a smart home system comprising a plurality of home devices, the device comprising:
a controller; and
a communicator coupled to the controller and configured to communicate with a user terminal,
wherein the controller is configured to:
control the user terminal to display a first screen that requests a user to select one home device from the plurality of home devices;
receive, from the user terminal, a selection of the home device;
control the user terminal to display a second screen that requests the user to perform a plurality of pointing gestures toward the selected home device;
control a camera coupled to the device, to capture, in response to performing the plurality of pointing gestures by the user within a field of view (FOV) of the camera, the plurality of pointing gestures;
configure a pointing ray using each of the plurality of captured pointing gestures;
estimate a position of a nearest point extending from the plurality of pointing rays; and
register the estimated position of the nearest point as a position of the selected object,
wherein the controller is further configured to provide a plurality of images by capturing each of the plurality of pointing gestures a plurality of times,
wherein the controller is further configured to identify a head position of the user a plurality of times using the plurality of images, to calculate a mean head position of the user by averaging the identified head positions of the user, to identify a hand position of the user a plurality of times using the plurality of images, to calculate a mean hand position of the user by averaging the identified hand positions of the user, to define a gesture-direction vector using the mean head position of the user and the mean hand position of the user, and to configure the pointing ray using the mean head position of the user and the gesture-direction vector, and
wherein the controller is further configured to configure the pointing ray using the following equation:

$$r_n = P_n + a_n \cdot u_n$$

where n denotes an index indicating a pointing ray number, $r_n$ denotes an n-th pointing ray, $P_n$ denotes a mean head position of the user used to configure the n-th pointing ray, $a_n$ denotes a scalar value used to configure the n-th pointing ray, and $u_n$ denotes a gesture-direction vector used to configure the n-th pointing ray.

10. The device of claim 9, wherein the plurality of pointing gestures comprises a gesture of grabbing the selected home device with a hand or touching the selected home device from a distance.

11. The device of claim 9, wherein the controller is further configured to obtain a solution of a vector x defined by the following equations using a Least Square Method (LSM):

$$x = (A^T A)^{-1} A^T b$$

$$A = \begin{bmatrix} 1 & 0 & 0 & -u_{x1} & 0 & 0 & & 0 \\ 0 & 1 & 0 & -u_{y1} & 0 & 0 & & 0 \\ 0 & 0 & 1 & -u_{z1} & 0 & 0 & & 0 \\ 1 & 0 & 0 & 0 & -u_{x2} & 0 & & 0 \\ 0 & 1 & 0 & 0 & -u_{y2} & 0 & \cdots & 0 \\ 0 & 0 & 1 & 0 & -u_{z2} & 0 & & 0 \\ 1 & 0 & 0 & 0 & 0 & -u_{x3} & & 0 \\ 0 & 1 & 0 & 0 & 0 & -u_{y3} & & 0 \\ 0 & 0 & 1 & 0 & 0 & -u_{z3} & & 0 \\ & & & \vdots & & & \ddots & \vdots \\ 1 & 0 & 0 & 0 & 0 & 0 & & -u_{xn} \\ 0 & 1 & 0 & 0 & 0 & 0 & \cdots & -u_{yn} \\ 0 & 0 & 1 & 0 & 0 & 0 & & -u_{zn} \end{bmatrix}$$

-continued $$x = \begin{bmatrix} x \\ y \\ z \\ a_1 \\ a_2 \\ a_3 \\ \vdots \\ a_n \end{bmatrix}$$

$$b = \begin{bmatrix} x_1 \\ y_1 \\ z_1 \\ x_2 \\ y_2 \\ z_2 \\ x_3 \\ y_3 \\ z_3 \\ \vdots \\ x_n \\ y_n \\ z_n \end{bmatrix}$$

where $u_{xn}$, $u_{yn}$, and $u_{zn}$ denote x, y, and z components in an orthogonal coordinate system of a gesture-direction vector $u_n$ used to configure an n-th pointing ray, x, y, and z are variables indicating x, y, and z components in an orthogonal coordinate system of the nearest point, and $x_n$, $y_n$, and $z_n$ denote x, y, and z components in an orthogonal coordinate system of a head position $P_n$ of a user used to configure the n-th pointing ray.

* * * * *